(12) United States Patent
Ravel

(10) Patent No.: US 12,145,718 B2
(45) Date of Patent: *Nov. 19, 2024

(54) AIRCRAFT UNDERCARRIAGE WITH BRAKED AND MOTOR-DRIVEN WHEELS

(71) Applicant: SAFRAN LANDING SYSTEMS, Velizy Villacoublay (FR)

(72) Inventor: Jean-Yves Ravel, Velizy-Villacoublay (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 330 days.

This patent is subject to a terminal disclaimer.

(21) Appl. No.: 16/171,756

(22) Filed: Oct. 26, 2018

(65) Prior Publication Data

US 2019/0127053 A1  May 2, 2019

(30) Foreign Application Priority Data

Oct. 27, 2017 (FR) ...................................... 1760199

(51) Int. Cl.
*B64C 25/20* (2006.01)
*B64C 25/22* (2006.01)
*B64C 25/32* (2006.01)
*B64C 25/34* (2006.01)
*B64C 25/36* (2006.01)
*B64C 25/42* (2006.01)
*B64C 25/60* (2006.01)

(52) U.S. Cl.
CPC .............. *B64C 25/20* (2013.01); *B64C 25/22* (2013.01); *B64C 25/34* (2013.01); *B64C 25/36* (2013.01); *B64C 25/405* (2013.01); *B64C 25/42* (2013.01); *B64C 25/60* (2013.01); *B64C 2025/345* (2013.01)

(58) Field of Classification Search
CPC ... B64C 2025/345; B64C 25/20; B64C 25/22; B64C 25/34; B64C 25/36; B64C 25/405; B64C 25/42; B64C 25/60; Y02T 50/80
USPC ............................................................ 244/50
See application file for complete search history.

(56) References Cited

U.S. PATENT DOCUMENTS 2,281,351 A * 4/1942 Dowty .................... B64C 25/38
244/103 S
2,755,041 A * 7/1956 Lewis ..................... B64C 25/34
244/102 R (Continued)

FOREIGN PATENT DOCUMENTS

EP   2 243 703 A1   10/2010
EP   3 100 949 A1   12/2016

(Continued)

OTHER PUBLICATIONS

French Preliminary Search Report issued in FR 1760199 dated May 8, 2018.

*Primary Examiner* — Nicholas McFall
*Assistant Examiner* — Marisa V Conlon
(74) *Attorney, Agent, or Firm* — Sughrue Mion, PLLC

(57) ABSTRACT

The invention relates to an aircraft undercarriage provided at its bottom end with a rocker arm (2) carrying at least two axles (4, 5), including one in front of a hinge between the rocker arm and the undercarriage and the other behind said hinge. According to the invention, one of the axles is fitted with one or more braked wheels (6) and the other axle is fitted with one or more motor-driven wheels (8).

7 Claims, 1 Drawing Sheet

(56) References Cited

U.S. PATENT DOCUMENTS

| | | | | |
|---|---|---|---|---|
| 3,091,416 A | * | 5/1963 | Knights | B64C 25/50 244/50 |
| 2003/0033927 A1 | * | 2/2003 | Bryant | B64C 25/62 91/471 |
| 2008/0258014 A1 | | 10/2008 | McCoskey et al. | |
| 2009/0108131 A1 | * | 4/2009 | Lavigne | B64C 25/12 244/102 A |
| 2010/0116930 A1 | * | 5/2010 | Griffin | B64C 25/34 244/102 A |
| 2011/0266388 A1 | * | 11/2011 | Sorin | B64C 25/405 244/50 |
| 2012/0126055 A1 | * | 5/2012 | Lindahl | B64C 25/60 244/104 FP |
| 2012/0211600 A1 | * | 8/2012 | Mellor | B64C 25/00 244/100 R |
| 2014/0346273 A1 | * | 11/2014 | Nelson | B64C 25/34 244/102 A |
| 2014/0374538 A1 | * | 12/2014 | Schmidt | B64C 25/34 244/103 R |
| 2015/0301531 A1 | * | 10/2015 | Gama-Valdez | B64C 25/34 701/3 |
| 2016/0257398 A1 | * | 9/2016 | Bennett | B64C 25/34 |
| 2018/0086439 A1 | * | 3/2018 | Thompson | B64D 45/00 |
| 2018/0304999 A1 | * | 10/2018 | Schmidt | B64C 25/34 |
| 2019/0016319 A1 | * | 1/2019 | Thompson | B64C 25/34 |

FOREIGN PATENT DOCUMENTS

| | | | |
|---|---|---|---|
| FR | 3 019 796 A1 | 10/2015 | |
| GB | 2 483 472 A | 3/2012 | |
| WO | 2006/071262 A1 | 7/2006 | |
| WO | WO-2009047367 A2 * | 4/2009 | F16F 9/3264 |

* cited by examiner

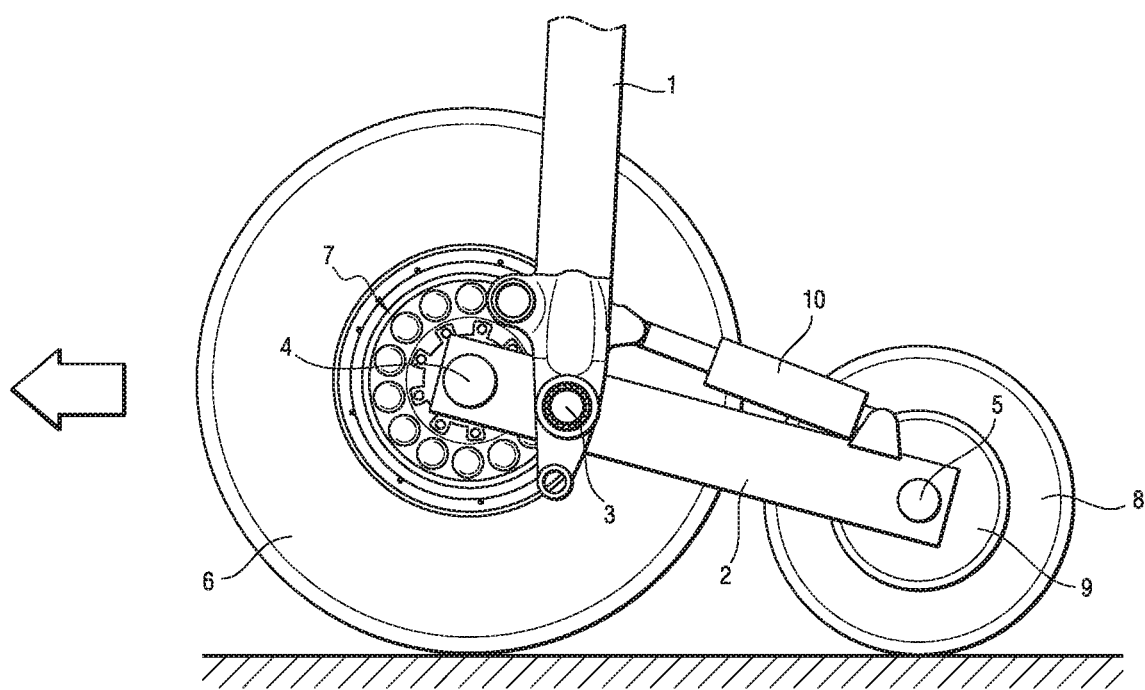

AIRCRAFT UNDERCARRIAGE WITH BRAKED AND MOTOR-DRIVEN WHEELS

The invention relates to an aircraft undercarriage with braked and motor-driven wheels

BACKGROUND OF THE INVENTION

Aircraft undercarriages are known that carry wheels, each of which is associated with a respective brake. Recent developments have led to proposing motor drive for such wheels in order to enable aircraft to move without help from its engines. It is technically difficult to fit a wheel with a motor when the wheel is already provided with a brake, in particular for reasons of available space and cooling. In particular, the rim of the wheel is already filled to a considerable extent by the disks of the brake, and there is very little room to arrange a motor and its coupling device in the space available in the immediate proximity of the wheel. Proposals have thus been made to specialize wheels, by fitting an aircraft both with wheels that are braked only and with wheels that are motor-driven only, each kind of wheel being much simpler to design and mount on an undercarriage. In particular, proposals are made in Document FR 3 019 796 to provide undercarriages with braked wheels only and to provide an auxiliary leg with one or more motor-driven wheels in order to move the aircraft, the auxiliary leg being deployed after the aircraft has landed on the ground. That arrangement raises the question of deploying at least one additional leg, which makes the undercarriages more difficult to manage.

OBJECT OF THE INVENTION

The invention seeks to propose a simplification to that arrangement, while retaining the principle of specializing wheels.

SUMMARY OF THE INVENTION

In order to achieve this object, there is provided an aircraft undercarriage provided at its bottom end with a rocker arm carrying at least two axles, including one in front of a hinge between the rocker arm and the undercarriage and the other behind said hinge, one of the axles is fitted with one or more braked wheels and the other axle is fitted with one or more motor-driven wheels.

The term "front" and "rear" should be understood relative to the usual forward travel direction of the aircraft. Thus, the wheels, all of which are specialized, are carried by a single undercarriage, so there is no point in making use of an additional leg, with the undercarriages then being managed in the usual way. All of the wheels support the weight of the aircraft and thus contribute actively to distributing said weight on the runway, both during landing and while taxiing. Specializing each of the axles also makes it possible to simplify routing cables and pipes by segregating on opposite sides of the leg the cables and pipes needed for controlling the brakes, and the cables needed for controlling the drive motors.

DESCRIPTION OF THE FIGURES

The invention can be better understood in the light of the following description of a particular embodiment of the invention given with reference to the sole accompanying FIGURE, which is a fragmentary side view of an aircraft undercarriage of the invention in the deployed position, with two wheels that would normally hide the rocker arm being omitted for greater clarity.

DETAILED DESCRIPTION OF THE INVENTION

The undercarriage of the invention shown herein has a leg 1 that is secured to the structure of the aircraft and that carries, at its bottom end, a rocker arm 2 that is hinged to the leg at a pivot 3. The rocker arm carries a front axle 4 lying in front of the pivot 3 and a rear axle 5 lying behind the pivot 3. The arrow to the left in the FIGURE indicates the usual direction of forward travel of the aircraft.

According to the invention, the front axle 4 carries two wheels 6 that are provided with brakes 7 (referred to herein as braked wheels, with only one braked wheel being visible in the FIGURE), while the rear axle 5 carries two wheels 8 that are provided with drive motors 9 (referred to herein as motor-driven wheels, with only one motor-driven wheel being visible in the FIGURE). Thus, while landing, the braked wheels 6 and the motor-driven wheels 8 touch the ground and together contribute to transmitting the weight of the aircraft to the ground. Only the braked wheels 6 contribute to slowing down the aircraft. Once the aircraft has landed on the ground, it is then possible to move the aircraft by means of the motor-driven wheels 8. The sequence for maneuvering the undercarriages is strictly identical to that of a conventional aircraft.

Since the braked wheels and the motor-driven wheels do not have the same functions, it is possible to give them different functional characteristics (diameter, size, tire inflation pressure, . . . ) in order to optimize their respective functions. Thus, in the example shown, the braked wheels 6 and their tires are greater in diameter than the motor-driven wheels 8. Likewise, the pivot 3 is not necessarily located in the middle of the rocker arm 2, but may be offset so as to cause more weight to be carried by the wheels of one or the other of the axles. Specifically, in this example, the pivot 3 is closer to the front axle 4 than to the rear axle 5, such that the braked wheels 6 are more heavily loaded than the motor-driven wheels 8.

In a particular aspect of the invention, a rocking shock absorber 10 is coupled between the leg 1 and the rocker arm 2 in order to exert at least one of the following actions:
control the angle between the rocker arm 2 and the leg 1 while the undercarriage is being raised;
damp oscillating movements of the rocker arm about the pivot 3; and
distribute the vertical load taken up by the front and rear wheels by exerting a controlled thrust force on the rocker arm 2.

To this end, the rocking shock absorber 10 includes adjustment means that are controlled to vary its length, its stiffness, and/or its ability to absorb shocks. In particular, the shock absorber 10 is preferably controlled so as to apply a force on the rocker arm 2 that tends to press the motor-driven wheels 8 against the ground while their motors are being operated to cause the aircraft to advance, thereby having the effect of increasing the load on said wheels and thus increasing their effectiveness in driving the aircraft. In addition, such a force can assist the aircraft in taking off by artificially lengthening the leg by pivoting the rocker arm once the braked wheels leave the ground.

The invention is not limited to the above description, but on the contrary covers any variant coming within the ambit defined by the claims. In particular, although each axle in this example carries two wheels, the invention may be applied to an undercarriage in which each axle carries only one wheel, or on the contrary carries more than two wheels, providing each axle carries wheels of only one type (braked wheels or motor-driven wheels).

In addition, although the distribution of load on the wheels of the front axle and the wheels of the rear axle can be modified by controlling the rocking shock absorber so that it exerts a force on the rocker arm, it is possible to use other means for distributing load, such as for example making provision for the pivot 3 of the rocker arm 2 to move longitudinally.

The invention claimed is:

1. An aircraft comprising at least one undercarriage having a leg provided at its bottom end with a rocker arm carrying at least two axles, including one in front of a hinge between the rocker arm and the undercarriage and the other behind said hinge, the undercarriage being characterized in that one of the axles is fitted with one or more braked wheels and the other axle is fitted with one or more motor-driven wheels, and the undercarriage including a rocking shock absorber coupled between the leg and the rocker arm, a length of the rocking shock absorber varying so as to cause the application of a force to the hinge in order to press the motor-driven wheels against the ground and to increase the load on the motor-driven wheels so as to increase an effectiveness of the motor-driven wheels in moving the aircraft on the ground without help from engines of the aircraft.

2. The aircraft according to claim 1, wherein the braked wheels are carried by the front axle and the motor-driven wheels are carried by the rear axle.

3. The aircraft according to claim 1, wherein the rocking shock absorber allows an angle between the rocker arm and the leg to be adjusted during a stage of raising the undercarriage.

4. The aircraft according to claim 1, wherein a stiffness of the rocking shock absorber varies in order to dampen oscillatory movements of the rocker arm about the pivot.

5. The aircraft according to claim 1, wherein the rocking shock absorber distributes the vertical load taken up by the wheels by exerting a controlled thrust force on the rocker arm.

6. A method of taxiing of an aircraft comprising at least one undercarriage having a leg provided at its bottom end with a rocker arm carrying at least two axles, including one in front of a hinge between the rocker arm and the undercarriage and the other behind said hinge, one of the axles being fitted with one or more braked wheels and the other axle being fitted with one or more motor-driven wheels, the undercarriage including a rocking shock absorber that is coupled between the leg and the rocker arm, the rocking shock absorber having length which varies, the method including the step of adjusting the length of the rocking shock absorber so as to cause the application of a force to the hinge in order to press the motor-driven wheels against the ground and to increase the load on the motor-driven wheels so as to increase an effectiveness in moving the aircraft on the ground without help from engines of the aircraft.

7. The method according to claim 6, wherein the braked wheels are carried by the front axle and the motor-driven wheels are carried by the rear axle.

* * * * *